United States Patent [19]
Moon et al.

[11] Patent Number: 5,808,278
[45] Date of Patent: Sep. 15, 1998

[54] ELECTRONIC APPLIANCE AND A SABBATH MODE THEREFOR

[75] Inventors: Chang Hwan Moon, Dayton; Jonathan T. Smith, Beavercreek, both of Ohio

[73] Assignee: Whirlpool Corporation, Benton Harbor, Mich.

[21] Appl. No.: 742,188

[22] Filed: Oct. 31, 1996

Related U.S. Application Data

[60] Provisional application No. 60/008,290, Dec. 6, 1995.

[51] Int. Cl.⁶ .................................................. H05B 1/02
[52] U.S. Cl. ........................ 219/506; 219/412; 219/492; 219/508; 200/43.01
[58] Field of Search .................................. 219/487, 506, 219/501, 492, 497, 508, 509, 502, 411–413; 307/117, 119; 200/43.01

[56] References Cited

U.S. PATENT DOCUMENTS

| | | |
|---|---|---|
| 3,980,980 | 9/1976 | Zioni et al. .............................. 335/205 |
| 4,031,435 | 6/1977 | Zioni et al. .............................. 361/186 |
| 4,071,116 | 1/1978 | Halperin et al. .......................... 187/29 |
| 4,198,576 | 4/1980 | Staton .................................. 307/141.8 |
| 4,363,944 | 12/1982 | Poirier .................................... 200/42 R |
| 4,375,583 | 3/1983 | Halperin et al. .......................... 179/90 |
| 4,506,120 | 3/1985 | Fleischman ........................... 200/42 R |
| 4,513,189 | 4/1985 | Ueda et al. ........................... 219/10.55 |
| 4,611,295 | 9/1986 | Fowler .................................... 364/184 |
| 4,814,588 | 3/1989 | Hotta et al. ............................. 219/492 |
| 4,819,714 | 4/1989 | Otsuka et al. ............................. 165/12 |
| 5,299,113 | 3/1994 | England et al. ......................... 364/140 |

*Primary Examiner*—Mark H. Paschall
*Attorney, Agent, or Firm*—Thomas A. Schwyn; Robert O. Rice; Joel M. Van Winkle

[57] ABSTRACT

An appliance capable of being operated in compliance with the Orthodox Jew requirement that no work shall be done on the Sabbath. The appliance has a control system that monitors and controls all of the components of the appliance. The control system can be activated so that it prevents all visual displays and audible alarms from being actuated by the user during the Sabbath. The control system also prevents any actions of the user from causing the machine to do work.

22 Claims, 3 Drawing Sheets so as not to create a work. For example, the user could have to turn the Sabbath mode on before sundown on Friday and off after sundown on Saturday.

ELECTRONIC APPLIANCE AND A SABBATH MODE THEREFOR

This application claims the benefit of U.S. Provisional Application Ser. No. 60/008,290 filed on Dec. 6, 1995.

BACKGROUND OF THE INVENTION

1. Field of the Invention

The invention relates to a household appliance, and specifically, to a sabbath mode for a household appliance wherein the appliance can be operated during the Sabbath in compliance with Orthodox Jew custom of no work on the Sabbath.

2. Discussion of the Related Art

Overly simplifying, it is a custom of Orthodox Jews that no work can be done on the Sabbath. The custom forbidswork to be done by the user of a household appliance and constrains the user from causing the appliance to change its normal pattern of operation, e.g., an action by the user results in the illumination of a display, the activation of an audible display or the turning on of a light. Unfortunately, many new household appliances have control systems with a variety of visual and audible indicators and aids, such as interior lights, that make it very difficult, if not impossible, for Orthodox Jews to operate the appliances in compliance with the custom during the Sabbath. For example, most refrigerators and ovens have an interior light that is activated by the user of the appliance by opening the door. Under most interpretations of the custom, the interior light would satisfy the custom if it always remained on or off, but was not activated by the opening of the door. This has resulted in many Orthodox Jews unscrewing or removing the interior lights of the appliance prior to the Sabbath and replacing after the Sabbath. Another example with respect to ovens is that they must be turned off and on to cook. A generally recognized solution is to turn the oven prior to the Sabbath and leave it on until after the Sabbath. Alternatively, the oven could be left off during the Sabbath. Obviously, all the previous solutions are very inconvenient and are a disadvantage of the current appliances.

SUMMARY OF THE INVENTION

The invention eliminates the disadvantages and inconveniences of the current appliances and their control systems by providing a method and an appliance that can be operated during the Sabbath in accordance with the Orthodox Jewish custom. Generally, all indicators and aids of the appliance that would not comply with the custom during normal operation are fixed in a state that does comply with the custom. Thus, the user is free to continue use of the appliance without fear of not complying with the custom. The control system of the appliance is provided with a sabbath mode that automatically conforms the operation of the appliance with the custom when the sabbath mode is activated.

DESCRIPTION OF THE PREFERRED EMBODIMENTS

Figure 1:
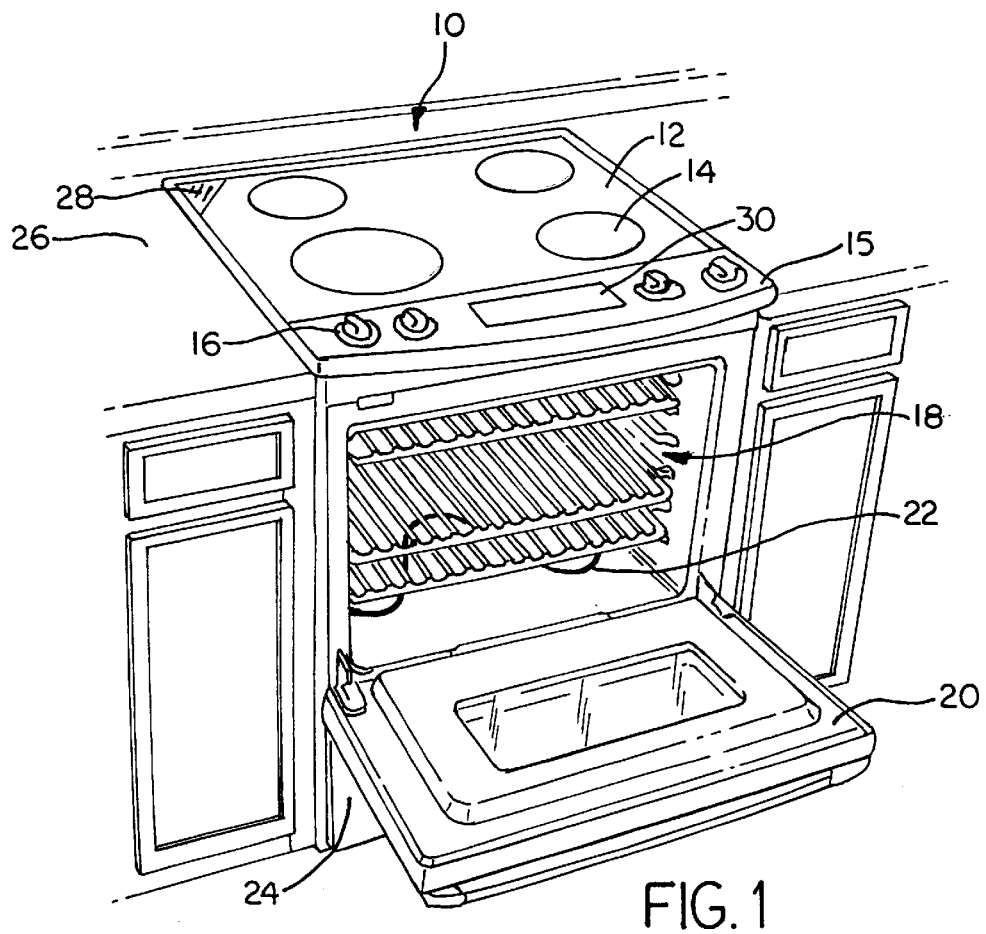
FIG. 1 is a perspective view of a representative appliance, an electric range with a control panel, with which the sabbath mode of the present invention can be utilized.

FIG. 1 illustrates an appliance that can be operated during the Sabbath in conformance with the custom of Orthodox Jews. For illustration purposes, the appliance is an electric range 10. However, it should be noted that the invention is applicable to any appliance and is not limited to an electric range.

The range 10 has a cooktop surface 12 having a plurality of burners 14 and a control panel 15. The control panel 15 provides cooktop control knobs 16 for controlling the burners 14 on the 10 cooktop surface 12. The range 10 also provides an oven cavity 18 for baking and broiling food. The range 10 also has an oven door 20. FIG. 1 shows the range with the oven door 20 in an open position. The open oven door 20 exposes the oven cavity 18 and a heating element 22 therein. The oven cavity has an interior light 25 (FIG. 5) which is activated by opening the door 20. A storage drawer 24 is provided beneath the oven cavity 18. Also shown is a counter top 26. The cooktop surface 12 is flush with the 15 counter top 26.

Another feature of the cooktop surface 12 is an oven vent 28 located near the rear of the cooktop surface 12. Toward the front of the cooktop surface 12 is the control panel 15 which further has an electronic oven control 30 for controlling the operation of the oven.

Figure 2:
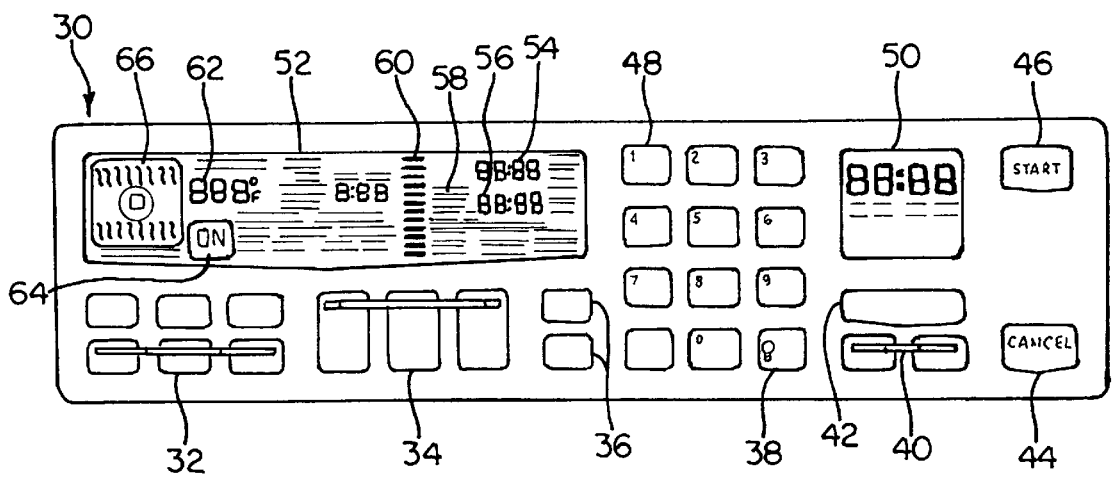
FIG. 2 is a plan view of the control panel of the electric range of FIG. 1.

FIG. 2 illustrates the electronic oven control 30 of the present invention. The control 30 controls the operation of the oven based on user inputs and provides information of the operation to the user via a variety of visual and audible indicators. As shown, the electronic oven control 30 has a multitude of pads and displays thereon to provide a convenient interface for a user when cooking foods using the thermal convection oven. In a preferred embodiment the plurality of pads are membrane switch pads, which allow a clean, flush appearance and simple use. Also, vacuum fluorescent displays are preferred. Beginning in the lower left corner of the electronic oven control 30 and continuing in a counter-clockwise direction, a brief description of the components of the electronic oven control 30 will now be described.

The electronic oven control 30 provides oven setting pads 32 for choosing between convection and standard cooking and baking. Also provided are timed and delayed cooking pads 36, an oven light pad 38 and timer pads 40. For convenience, a clock set-start pad 42 is also provided.

In addition, the electronic oven control 30 provides a cancel/off pad 44 and a start pad 46. Also, number pads 48 having digits 0–9 are provided for inputting numerical values for cooking temperatures and times.

Moreover, the electronic oven control 30 provides a time of day/timer display 50 and an oven display 52. The timer display 50 and the oven display 52 provide valuable information to the user of the oven. For example, the oven display 52 has visual readouts of several oven-related variables and indicators. For example, a digital start time 54 and digital stop time 56 are provided. Also provided is a check food indicator 58 for instructing a user when to check on the food to see if it is done cooking. A bar graph indicator 60 has a number of segments in a vertical column to graphically display the decrementing time until the oven cavity 18 is at the selected preheat temperature. A digital temperature readout 62 provides the user with the temperature of the oven cavity 18. Also, an ON indicator 64 is provided so that the user knows the oven is on. Finally, an oven indicator 66 symbolically shows which elements of the oven cavity 18 are active at a certain time, for example whether convection is operating or standard conventional operation is being used.

Figure 3:
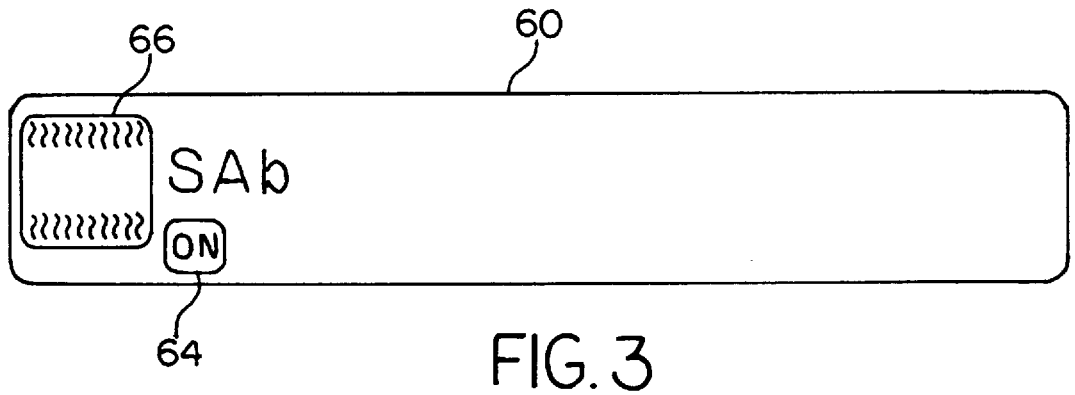
FIG. 3 is an enlarged view of the control panel of FIG. 2 when the electric range is operating in the sabbath mode according to the invention.

FIG. 3 is an enlarged view of the oven display 52 when the control 30 is in the sabbath mode according to the invention. In the sabbath mode, the temperature readout 62 shows the three letters SAb to indicate the sabbath mode. Thus, the user has a visual indication that the oven is operating in the sabbath mode.

The sabbath mode has the advantage of providing the user with a means to operate a household appliance, such as the oven 10, in conformity with the the no work requirement. The sabbath mode in essence controls the appliance so that no action by the user will be work or will cause the appliance to work patterns. To accomplish this, the sabbath mode places in a fixed state or disables the indicators and aids of the appliance for the duration of the Sabbath. Generally, the sabbath mode will turn off and/or turn on all user actuable indicators or aids, such as audible or visual open door alarms or interior lights, for the duration of the Sabbath. The sabbath mode also makes use of a software controlled door switch delay so that the user's actions of the door will not have immediate effect on software execution. Thus, the user is able to operate the appliance without concern of violating the custom.

Figure 4:
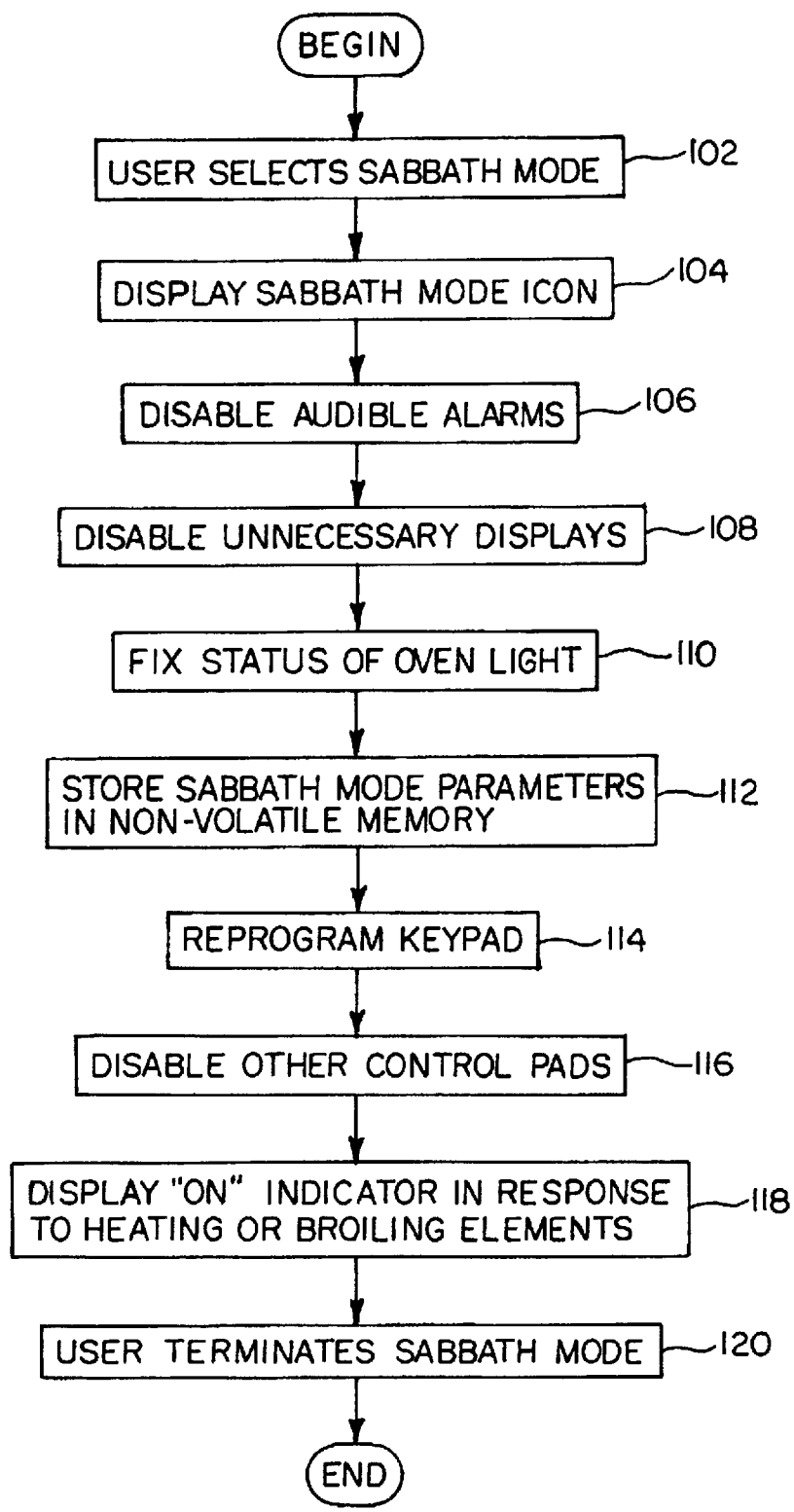
FIG. 4 illustrates a flowchart of the steps for initiating and operating the sabbath mode.

FIG. 4 illustrates the first embodiment of the steps for initiating and controlling the operation of the sabbath mode. In step 102, the user initiates the sabbath mode. It is presumed for this description that the control 30 will permit the initiation of the sabbath mode only when a compatible baking or cooking mode is selected. For example, an untimed bake mode is satisfactory where a timed bake mode is not because the timed bake automatically turns the oven off and would require the user to restart the oven manually during the Sabbath.

Preferably, the sabbath mode is initiated by depressing one of the keys on the numeric keypad for a predetermined amount of time to ensure that the user does wish to initiate the sabbath mode. In the preferred embodiment, the user will depress the "6" key on the numeric key pad for five seconds to initiate the sabbath mode. However, it should be evident to one skilled in the art that the sabbath mode could be activated in a variety of ways, including the addition of a sabbath mode key on the control 30. For example, if the control 30 had a calendar, the sabbath mode could be activated automatically at the appropriate time of the week.

Once the sabbath mode is activated, the temperature display displays the letters SAb as is shown in step 104. In step 106 all audible signals are disabled for the duration of the sabbath mode. Similarly, step 108 disables all unnecessary displays, such as, for example, timer 50, start and stop times 54, 56, check food indicator 58, bar graph 60. However, the ON indicator 64 and oven indicator 66 are not disabled in the preferred embodiment.

Step 110 fixes the status of the oven light and any other relevant lights. That is, if the oven light was on when the sabbath mode is initiated, the light will remain on until the end of the sabbath mode. Likewise, if the light is off, it remains off for the duration of the sabbath mode. Typically, this is accomplished by disabling the oven light pad 38 and preventing the opening of the door 20 from activating the light. Alternatively, it is possible to permit the user to select the light as either off or on before or as part of the setup for the sabbath mode.

In step 112, the variable parameters of the sabbath mode, such as oven light on or off, along with an indication that the sabbath mode was set are stored in the nonvolatile memory 132 (FIG. 5) of the control 30. Thus, if there is a power failure during the sabbath mode, the appliance will restart in the sabbath mode with the same settings when power is restored.

The keypad 48 is reprogrammed so that each of the keys represents a different temperature in step 114. Preferably, the keys are reprogrammed according to Table 1. It should be noted that the keypad can be reprogrammed for any set of temperatures as desired.

TABLE 1

| Key | Definition |
| --- | --- |
| 1 | 170° F. |
| 2 | 200° F. |
| 3 | 250° F. |
| 4 | 275° F. |
| 5 | 300° F. |
| 6 | 325° F. |
| 7 | 350° F. |
| 8 | 375° F. |
| 9 | 400° F. |
| 0 | 450° F. |

By reprogramming the keypad, the user is able to select a variety of temperatures at which the oven can operate without using a display or causing a display to change according to the user's selection. In step 116, all the unused or unneeded pads of the control are disabled so that the user cannot accidentally activate any of the pads and cause the machine to enter a different mode during the duration of the sabbath mode.

In step 118, the heating element 22 is polled to determine if the element is currently on. If it is, the element indicator 66 (curved lines) is illuminated. The user of the appliance is free to open the door when the element indicator is illuminated so that that user's opening of the door will not "turn on" the element 22. It is preferred that the element indicator 66 pulse for a predetermined time period, approximately five seconds, prior to a change is status of the heating element 22 (or broiler element in some instances) to give the user warning of a pending change. Alternatively, the ON indicator 64 could pulse prior to a status change in the heating element.

Preferably, the status of the element indicator 66 is fixed if the user opens the oven door 24 so that the user's action of opening the door does not change the elementindicator, which would be considered work. The control 30 would delay the status change of the element indicator 66 for a predetermined amount of time, approximately 30 seconds, after the door is closed. Similarly, if the heating element 22 is on when the door is opened, it will be turned off approximately five seconds after opening and will not be turned on until approximately 30 seconds after the door is closed.

In step 120, the sabbath mode is terminated by the user. Preferably, in the same manner by which the sabbath mode was initiated: by depressing the "6" key for five seconds. As stated above, there are many ways to turn on such a mode and, likewise, there are many ways to turn off such a mode.

Figure 5:
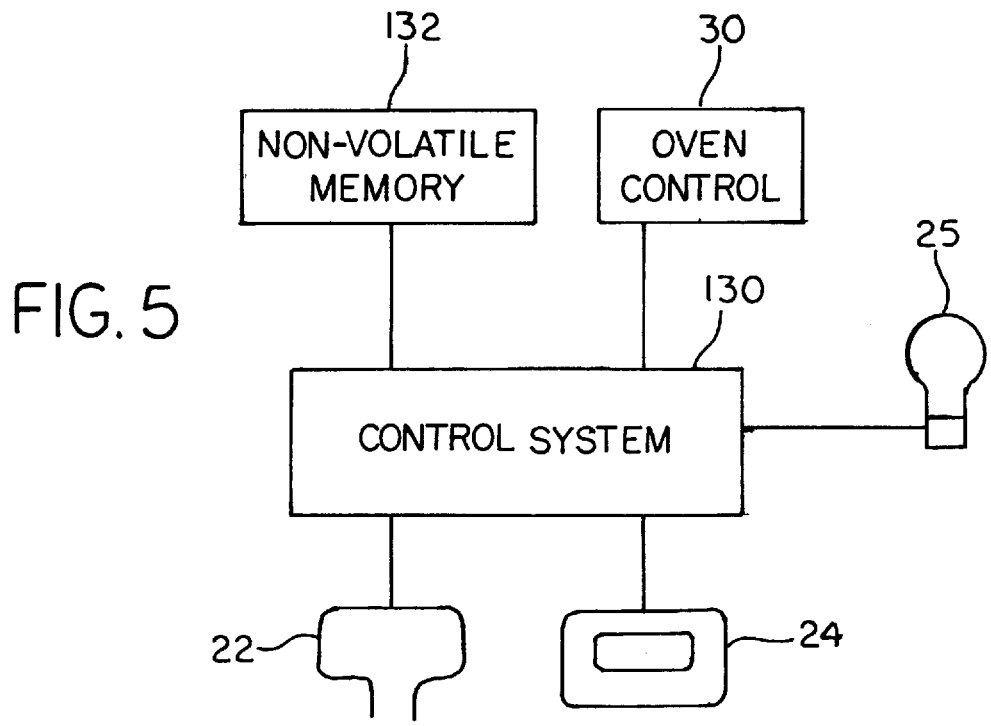
FIG. 5 is a block diagram of an embodiment of an oven incorporating the sabbath mode according to the invention.

FIG. 5 illustrates a functional block diagram of the elements of an oven having a sabbath mode according to the invention. As illustrated, an oven control system 130 is the heart of the invention. The control system 130 is connected to non-volatile memory 132 in which the sabbath mode parameters are stored. The oven control 30 is connected to the control system 130 and sends and receives input and output from and to the oven control 30. Thus, the control system can control the operation of the displays and pads of the oven control 30. The control system 130 is also connected to several other components of the oven. The oven light 134 is connected to the control system so that the controller can control the operation of the light. Also, the heating element is connected to the control system 130. In addition, the oven door is connected to the control system 130. Thus, the control system can monitor the status of all the components of the oven to ensure that the oven is operated in accordance with the no work custom.

Although the present invention has been described with reference to a specific embodiment, those of skill in the Art will recognize that changes may be made thereto without departing from the scope and spirit of the invention as set forth in the appended claims.

We claim:

1. A method for controlling an appliance to operate in an alternate control mode, the appliance having a plurality of visual displays, at least one audible alarm and a heater, all of which are connected to and controlled by a control system with a control panel for user input, the appliance further having at least one light and a door, the method comprising:

disabling the at least one audible alarm;

fixing the state of the at least one light; and delaying the change of state of the heater in response to opening the door.

2. The method as claimed in claim 1, wherein the control panel includes a keypad having a plurality of keys for user input, and wherein at least one of the plurality of keys is disabled.

3. The method as claimed in claim 1, the method further comprising the step of initiating the disabling step and the fixing step.

4. The method as claimed in claim 3, wherein the initiating step is automatically started by the control system in response to a calendar internal to the control system.

5. The method as claimed in claim 3, wherein the initiating step is manually started by a user through the keypad of the control panel.

6. The method as claimed in claim 1, further comprising the step of disabling at least one of the plurality of visual displays.

7. The method as claimed in claim 1 wherein the control panel has a keyboard having a plurality of keypads for permitting entry of operating information, the method further comprising the step of:

reprogramming the keyboard such that operating information may be entered without causing a display to change.

8. A method for controlling an appliance operable in more than one mode including an alternate control mode, the appliance having indicators, such as a plurality of visual displays and at least one audible alarm, for indicating the status of the appliance and components such as at least one light and at least one heater, both the indicators and components are connected to and controlled by a control system, which has a control panel with a plurality of keypads, permitting entry of operating information, including the selection of an operating mode, the method of operating the appliance in the alternate control mode comprising:

fixing the state of the at least one light; and reprogramming the keypads such that operating data may be input without causing a display to change.

9. The method as claimed in claim 8, further comprises the step of disabling at least one of the plurality of visual displays.

10. The method as claimed in claim 8 further including the step of disabling at least one of the keypad to prevent the user from accidentally turning on an indicator.

11. The method as claimed in claim 8, wherein the at least one light state fixing step includes the step of selecting the state in which the at least one light is fixed.

12. The method as claimed in claim 8, further comprising the step of delaying the change in state of the at least one of heater.

13. The method as claimed in claim 8, and further comprising the step of selecting the Sabbath mode of operation.

14. The method as claimed in claim 13, the mode selecting step is automatically selected by the control system based on an internal calendar.

15. The method as claimed in claim 14, wherein the control system includes a microprocessor having non-volatile memory and further comprising the step of storing the mode selection information in the non-volatile memory to provide for the appliance to restart in the automatically controlling mode in a restart after a power failure.

16. A method for controlling an oven operable in more than one mode including an alternate control mode, the oven defining an oven cavity closed by a door, the oven further having a plurality of indicators, such as a plurality of visual displays and at least one audible alarms, for indicating the status of the oven and components, such as at least one interior light and at least one heating element, both the indicators and components are connected to and controlled by a microprocessor control system which has a control panel with a keyboard having a plurality of keypads, permitting entry of operating information, including the selection of an operating mode, the method of operating the oven in the alternate control mode comprising:

disabling at least one of the plurality of indicators, fixing the state of the at least one interior light, and delaying the change in state of the at least one heating element in response to a user opening the door.

17. The method as claimed in claim 16, further comprising the step of disabling at least one of the plurality of keypads to prevent the user from accidentally turning on an indicator.

18. The method as claimed in claim 16, wherein the light state fixing step includes the step of selecting the state in which the at least one light is fixed.

19. The method as claimed in claim 18, wherein the at least one light is fixed in the on state by the user by entering the state selection into the microprocessor by the keyboard.

20. The method as claimed in claim 19, and further comprising the step of selecting the Sabbath mode as a mode of operation.

21. The method as claimed in claim 20, wherein the microprocessor control system has a non-volatile memory and further comprising the step of storing the mode selection information in the non-volatile memory to provide for the appliance to restart in the automatically controlling mode in a restart after a power failure.

22. The method as claimed in claim 16, method further comprising the step of:

reprogramming the keyboard such that an oven temperature may be set without causing a display to change.

\* \* \* \* \*